United States Patent [19]

Brooks et al.

[11] 4,442,272

[45] * Apr. 10, 1984

[54] PRODUCTION OF COPOLYMERS USING SHORTSTOP AGENT AT END OF POLYMERIZATION

[75] Inventors: Herbert Brooks, Twyford; Frederick A. Waite, Farnham Common, both of England

[73] Assignee: Imperial Chemical Industries PLC, London, England

[*] Notice: The portion of the term of this patent subsequent to Oct. 26, 1999 has been disclaimed.

[21] Appl. No.: 293,334

[22] Filed: Aug. 17, 1981

[30] Foreign Application Priority Data

Sep. 17, 1980 [GB] United Kingdom ................. 8030043

[51] Int. Cl.$^3$ ............................................... C08F 2/26
[52] U.S. Cl. ........................................ 526/82; 526/85; 526/317; 44/62
[58] Field of Search ..................... 526/82, 85

[56] References Cited

U.S. PATENT DOCUMENTS

| | | | |
|---|---|---|---|
| 3,091,518 | 5/1963 | Kizer et al. | 526/82 |
| 3,296,226 | 1/1967 | McCoy, Jr. | 526/82 |
| 3,393,182 | 7/1968 | Trepka | 526/82 |
| 3,458,491 | 7/1967 | Dennis | 526/82 |
| 3,553,184 | 1/1971 | Federer et al. | 526/82 |
| 4,356,003 | 10/1982 | Brooks et al. | 526/317 |

FOREIGN PATENT DOCUMENTS 50-38784  9/1975  Japan ...................................... 526/82

OTHER PUBLICATIONS

Ind. & Eng. Chem. vol. 45, No. 1, pp. 182-186, G. S. Antlfinger et al.

*Primary Examiner*—Joseph L. Schofer
*Assistant Examiner*—Peter F. Kulkosky
*Attorney, Agent, or Firm*—Cushman, Darby & Cushman

[57] ABSTRACT

A process is described for the production of copolymers derived predominantly from a monomer, e.g. tert-butylstyrene, having a very low solubility in water, by low temperature emulsion polymerization in a medium consisting substantially of water alone, under specified reaction conditions; high levels of conversion of monomer are achieved. The copolymer products are useful as additives to liquid hydrocarbon fuels for the purpose of reducing the tendency of the fuels to disseminate into mists under conditions of shock.

10 Claims, No Drawings

PRODUCTION OF COPOLYMERS USING SHORTSTOP AGENT AT END OF POLYMERIZATION

This invention relates to the manufacture of copolymers by a low temperature aqueous emulsion polymerisation process, and more particularly to such manufacture of copolymers which are derived predominantly from certain monomers which have a very low solubility in water, such as p-tert-butylstyrene or 2-ethylhexyl acrylate.

Certain copolymers of the above-mentioned type are of interest as additives to liquid hydrocarbon fuels, in particular to aviation fuels, whereby the tendency of such liquids to disseminate when subjected to conditions of shock may be controlled. Such copolymers are required to have an adequate solubility in the hydrocarbon fuel, for example in aviation kerosene, and to ensure this the major monomers from which they are derived are chosen to contain oil-soluble groups; these monomers are consequently of very low solubility in water. The copolymers are conveniently produced by emulsion polymerisation of the monomers in an aqueous medium at relatively low temperatures, that is to say at temperatures not exceeding 60° C., but, in order to overcome the inherently low level of conversion of monomer to polymer under these conditions, it has previously been proposed to enhance the solubility of the major monomer by including a proportion of a water-miscible organic co-solvent in the aqueous medium. Thus according to British Pat. Nos. 1,285,197 and 1,337,288 and British Published Application No. 2,045,778A which describe the production of copolymers derived predominantly from monomers of low water solubility including 2-ethylhexyl acrylate and p-tert-butylstyrene, an acceptable level of conversion of monomer is achieved by using a mixture of water and acetone as the aqueous medium. The use of acetone in this way, however, has a drawback. Isolation of the copolymer from the resulting latex by spray-drying of the latter, which is a particularly advantageous way of obtaining certain of the copolymers in a form in which they can conveniently then be incorporated in the hydrocarbon fuel, cannot be conducted on a commercial scale without appropriate precautions being taken against the risk of ignition of the acetone vapour evolved.

With the objective of overcoming this disadvantage, we have now developed a process whereby there can be produced copolymers derived predominantly from monomers, such as p-tert-butylstyrene, which have a very low solubility in water by a low temperature emulsion polymerisation procedure in a medium consisting substantially of water alone, with high levels of conversion of monomer.

According to the invention, there is provided a process for the production of a copolymer from a mixture comprising (i) a monomer selected from alkylstyrenes in which the alkyl group contains from 3 to 6 carbon atoms, the acrylic and methacrylic acid esters of aliphatic monohydric alcohols containing from 6 to 18 carbon atoms, vinyl esters of aliphatic carboxylic acids containing from 6 to 18 carbon atoms and vinyl ethers of aliphatic monohydric alcohols containing from 6 to 18 carbon atoms; (ii) from 2% to 8%, based on the total monomer mixture, of acrylic acid or methacrylic acid; and (iii) from 0% to 25%, based on the total monomer mixture, of one or more monomers selected from the acrylic and methacrylic esters of aliphatic monohydric alcohols containing from 1 to 4 carbon atoms, 2-ethoxyethyl methacrylate, acrylonitrile, vinyl acetate and vinyltoluene, the process comprising the emulsion polymerisation, in a wholly aqueous diluent as hereinafter defined, of the said monomer mixture and being characterised by the following features in combination:

(a) the ratio of the total weight of monomer mixture which is polymerised in the process to the weight of liquid diluent is from 1:19 to 3:2 by weight;

(b) there is present in the reaction mixture an anionic surfactant at a concentration in the range 3% to 20% of the total weight of monomer mixture which is polymerised;

(c) the reaction mixture is stirred at a temperature in the range 15°–60° C. for a period of from 6 to 10 hours in the presence of an inert gas atmosphere;

(d) there is added to the reaction mixture, after the establishment of the inert gas atmosphere, in an amount of 0.05% to 1.0% based on the weight of monomer mixture, a water-soluble initiator which is effective at the chosen polymerisation temperature;

(e) there is added to the reaction mixture when polymerisation of the monomers is complete, in an amount of from 0.001% to 0.1% based on the weight of monomer mixture taken, a chain transfer agent.

By the term "wholly aqueous diluent" we mean that the diluent consists of water unadmixed with any water-soluble or water-miscible organic co-solvent, such as acetone. The diluent will however contain, by deliberate addition, the surfactant and initiator necessary for the process and, without prejudice to the foregoing statement, it may also contain, either consequently or fortuitously, very small amounts of electrolyte impurities.

By "inert gas" we refer to nitrogen, argon or any other gas which is commonly used in the art of emulsion polymerisation.

Monomers which are suitable as the major component of the mixture which is polymerised according to the invention include, for example, p-tert-butylstyrene, 2-ethylhexyl acrylate, lauryl methacrylate, vinyl stearate and vinyl octyl ether.

The preferred major monomers are alkyl styrenes in which the alkyl group contains from 3 to 6 carbon atoms, in particular p-tert-butylstyrene.

Although the monomer mixture polymerised according to the invention may consist only of the major monomer (i) and the acidic monomer (ii), it is preferred to employ a monomer mixture which also contains one or more of the additional monomers (iii). In this case, a particularly preferred monomer mixture consists of (i) at least 75% by weight of p-tert-butylstyrene, (ii) from 2% to 8% by weight of acrylic acid or methacrylic acid and (iii) from 1% to 23% by weight of the further monomer or monomers selected from the foregoing group, the aggregate of monomers (i), (ii) and (iii) being 100%.

The process of the invention may be carried out in either of two ways. In the first alternative, which may conveniently be referred to as a "one-shot" procedure, the whole of the monomer mixture to be polymerised is introduced into the reaction mixture at the beginning. Under these circumstances, it is preferred that the weight ratio of the monomer mixture to the aqueous diluent is in the range 1:4 to 1:1. In the second alternative, which may be termed a 'seed and feed' procedure, a proportion of the monomer mixture is introduced as a single initial charge in order to form a seed dispersion of polymer, and the remainder of the monomer is then added gradually after polymerisation of the initial charge is complete. In this case, it is preferred that the initial monomer charge is in a weight ratio to the aqueous diluent of from 1:19 to 3:7, and that the amount of remaining monomer is sufficient to bring the overall ratio of monomer taken to diluent into the range 2:3 to 3:2.

Anionic surfactants which are suitable for use in the process include, for example, sodium dodecylbenzenesulphonate, alkali metal dialkylsulphosuccinates in which the alkyl group contains from 5 to 13 carbon atoms, e.g. sodium dioctylsulphosuccinate, sodium lauryl sulphate and the salts of sulphated nonylphenolethylene oxide condensates. In general, the commercial surfactant grades of any of the foregoing materials are satisfactory.

The anionic surfactant is preferably used in an amount of from 3% to 15% of the weight of the monomer mixture, more preferably from 5% to 10%. This amount may be added all at once at the beginning of the polymerisation, or gradually during the course of the polymerisation, as may be considered appropriate.

The polymerisation is preferably carried out at a temperature in the range 25°–40° C., more preferably in the range 28°–35° C., in both cases for a period of from 6 to 10 hours. An adequate flow of inert gas in contact with the polymerisation mixture is required throughout the process and, when the 'seed and feed' procedure is followed, the monomer which is added in the second stage is preferably purged with inert gas before its introduction into the reaction mixture.

The water-soluble initiators which are suitable for use in the process are any of those initiators which are known in the aqueous emulsion polymerisation art to be effective at the chosen polymerisation temperature. For temperatures in the greater part of the range already specified, that is to say in the range 25°–50° C., it will normally be desirable to employ a "redox" initiator system, of which a preferred example is ammonium persulphate in combination with ascorbic acid; other examples include ammonium persulphate or potassium persulphate in combination with sodium dithionite, sodium sulphite or sodium thiosulphate respectively (where a redox system is employed, references herein to "initiator" are to be understood as meaning the combination of the two components). However, at temperatures near to the upper limit of the range specified, viz. approaching 60° C., it may be satisfactory to employ a water-soluble initiator, such as ammonium persulphate, on its own. Preferably the amount of initiator used lies in the range 0.05 to 0.8%, more preferably 0.1 to 0.3%, based on the weight of monomer mixture.

In the case of the "one-shot" procedure, the initiator is preferably introduced into the reaction mixture as a single addition between 5 and 30 minutes after the establishment of the inert gas atmosphere in the reaction vessel. Further additions of initiator may subsequently be made if desired in order to ensure a high conversion of monomer to polymer. When the 'seed and feed' procedure is used, the initiator charge may be added all at once at the commencement, as in the case of the "one-shot" procedure, or it may be gradually added along with the monomer mixture.

Suitable chain transfer agents to be added after completion of the polymerisation of the monomers include n-octyl mercaptan, dodecyl mercaptan and chloroform. Preferably the amount of chain transfer agent added is about 0.005% of the weight of monomer taken.

In defining the process of the invention in the foregoing terms, it is assumed that the person skilled in the art will follow the general procedure which is customary in carrying out aqueous emulsion polymerisations, and will also observe the usual precautions particularly in regard to the exclusion of contaminants such as transition metal compounds and oxidising or reducing agents which may substantially influence the initiation mechanism and hence the course of the polymerisation.

By means of the process of the invention, high levels of conversion of monomer to polymer are achieved; typically these lie in the range 85–99%.

The copolymer latices obtained by the process of the invention, assuming that substantially complete conversion of monomer is achieved, contain from 5% to 60% by weight of copolymer solids depending upon the initial monomer-to-diluent ratio chosen and the amount of further monomers, if any, subsequently fed in. In general, solids contents of up to 50% may readily be achieved by the "one-shot" procedure; if solids contents in the range 50–60% are required, the 'seed and feed' procedure is to be preferred.

The copolymer particles obtained by means of the process described above may be isolated from the emulsion in ways which are well known in the art. A particularly suitable method of isolation is that of spray-drying, for those of the copolymers thus made which have glass-rubber transition temperatures above 40° C.

Copolymers made according to the invention are of especial interest as additives to liquid hydrocarbon fuels, in particular to aviation fuels, whereby the tendency of such liquids to disseminate when subjected to conditions of shock may be controlled.

It is known that when a liquid with a free surface is subjected to conditions of shock there is a tendency for the liquid to become disseminated in particulate form and that the effect of shock may be such as to convert a proportion of the liquid into a dispersion of fine liquid droplets in air, i.e. a mist.

It is very desirable to be able to control the extent to which such a dispersion or mist of liquid is formed under shock conditions since, for example, this mist, if inflammable, may constitute a hazard. A situation in which it is most important to keep to a minimum the formation of such mist under shock conditions is the crash of an aircraft carrying inflammable liquids, such as its fuel. Though hydrocarbon fuels now used for aircraft gas turbine engines may be of a higher flash point than aviation gasoline as used in spark-ignition engines, with a consequent reduction in the risk of fire due to ignition of vapour, nevertheless mists of fuels with flash points of 80° F. and higher are highly susceptible to ignition by flames, electrical sparking or the effect of friction, as well as by the presence of hot metal in the engines. There is therefore a considerable fire hazard immediately after a crash of an aircraft using such fuel. Furthermore, there is the risk of propagation of fire to the bulk of liquid fuel even if little damage is caused by ignition of the mist itself.

We have found that the tendency to particulate dissemination under shock conditions of a liquid hydrocarbon fuel suitable for use in gas turbined aircraft and having a flash point of at least 80° F. may be reduced by dissolving in the liquid a copolymer made in the way described above, in a concentration of from 0.05% to 1.0% by weight, preferably from 0.1% to 0.5% by weight.

Liquid hydrocarbon fuels which are of particular interest for modification with copolymers produced according to the invention include AVTUR 50 aviation kerosene, JP-8 (flash point 110° F. min) as specified in U.S. Military Specification MIL-T-83133, JP-5 (flash point 140° F. min) as specified in U.S. Military Specification MIL-T-5624G, and Jet A and Jet A-1 (flash point 110° F. min) as specified in ASTM Specification D.1655/68.

At the copolymer concentrations indicated above, dissolution of the copolymer (as isolated, for example, by spray drying) in the liquid fuel may be effected by simple stirring or agitation, although it is desirable in many cases to heat the mixture at the same time, e.g. to a temperature of 80° C. When it is not practicable to isolate the copolymer in powder form, an alternative procedure for dissolving it in the liquid fuel is to add the aqueous latex slowly to the liquid fuel maintained at a temperature in the range 130°-150° C., under which conditions the water from the latex is removed as an azeotrope.

The hydrocarbon fuels so modified are still liquids, in the sense that they have a viscosity of less than 1 poise, usually less than 0.1 poise.

Copolymers obtained by the process of the invention which are of particular value as hydrocarbon fuel additives for the purpose hereinabove described are those of (i) from 77% to 91% by weight of tert-butylstyrene, (ii) from 7% to 15% by weight of methyl methacrylate and (iii) from 2% to 8% of methacrylic acid. Preferred copolymers within this class are those of (i) from 82% to 89% of tert-butylstyrene, (ii) from 9% to 11% of methyl methacrylate and (iii) from 2% to 7% of methacrylic acid.

For the reason which has already been mentioned, especially useful copolymers obtained according to the invention are those having the compositions hereinabove defined which have a glass-rubber transition temperature (Tg) above 40° C.

Within the classes of copolymer thus delineated, particular effectiveness as hydrocarbon fuel additives for the suppression of particulate dissemination is shown by those copolymers which satisfy the further criteria that a 0.3% by weight solution of the copolymer in AVTUR 50 aviation kerosene has a relative viscosity in the range 1.3 to 2.1 and that the same solution has a differential orifice flow rate in the range 3 to 6 ccs. per 30 seconds.

By "AVTUR 50" we mean a liquid hydrocarbon fuel complying with U.K. Government Specification D. Eng. RD 2494 (NATO Code No. F-35). AVTUR 50 has a flash point not lower than 100° F., and normally has a viscosity of 1.0 to 1.5 cp. at 25° C.

By "relative viscosity" we mean the ratio of (i) the viscosity of the 0.3% by weight copolymer solution in AVTUR 50 when measured by the method of British Standard No. 188:1937 "The Determination of the Viscosity of Liquids in C.G.S. Units," Part 2, using a U-tube viscometer, Size A, at 25° C., to (ii) the viscosity of AVTUR 50 when measured under those same conditions.

By "differential orifice flow rate" we mean the difference between (a) the flow rate of a 0.3% by weight solution of the copolymer in AVTUR 50 through a passage of circular cross-section having a square-edged orifice, the passage having a length of 0.062 inches and a diameter of 0.025 inches, and (b) the flow rate through the same said passage of a Newtonian liquid having the same viscosity as that of the copolymer solution referred to in (a) when the said viscosities are measured by the method of British Standards No. 188:1937, the flow rates being expressed as the volume of liquid in ccs. which passes through the orifice during the second period of 30 seconds of flow. Apparatus suitable for carrying out the differential orifice flow rate determination may be constructed by appropriately modifying a type A cup according to British Standard No. 1733.

The invention is illustrated by the following Examples, in which parts, percentages and ratios are by weight.

EXAMPLE 1

In a flask equipped with stirrer, thermometer, gas inlet tubes and condenser, a mixture of p-tert-butylstyrene (306 parts), methyl methacrylate (36 parts) and methacrylic acid (18 parts) is coarsely emulsified in a solution in distilled water (1440 parts) of technical grade sodium dioctylsulphosuccinate (18 parts) ("Manoxol" OT, supplied by Machem Ltd: "Manoxol" is a Registered Trade Mark). The temperature of the mixture is adjusted to 30° C. and nitrogen is bubbled through the stirred reaction mixture at 200 ccs/min. for 5 minutes, when ammonium persulphate (0.36 part) and L-ascorbic acid (0.54 part), each separately dissolved in distilled water (9 parts), are added. The nitrogen flow rate is reduced to 40 ccs/min. and the reaction mixture is stirred for 8 hours, the temperature being maintained in the range 28°-32° C. A 0.1% solution of octylmercaptan in a mixture of acetone and distilled water in the ratio of 4:1 (18 parts) is then added and stirring is continued for a further 5-minute period. About 98% of the monomer charge is thus converted to polymer, to give a nominal 20% solids dispersion of polymer particles having a diameter of about 900 Å. An approximately 1.5% solution of the polymer in AVTUR 50 is prepared by drip feeding the dispersion into the stirred liquid hydrocarbon held at 130°-150° C., the water being removed simultaneously by azeotropic distillation. The concentration is then adjusted to 0.3% by the addition of further AVTUR 50 with gentle mixing. The relative viscosity of the 0.3% solution so obtained is 1.62 at 25° C. and the differential orifice flow rate is 5.1 ccs/30 seconds.

EXAMPLES 2-11

The procedure described in Example 1 is repeated, except that the mixture of monomers there specified is replaced by other monomer compositions as listed in the table below. The results of each Example are shown in the table.

| Example No. | Monomer Composition | Monomer Ratio | Monomer Conversion % | Particle Size Å | Characteristics of polymer 0.3% solution in AVTUR 50 Relative Viscosity at 25° C. | Diff. Orifice flow rate, cc/30 sec. |
|---|---|---|---|---|---|---|
| 2 | TBS/MMa/MA | 90:5:5 | 92.6 | 840 | 2.06 | 5.7 |
| 3 | " | 80:15:5 | 94.5 | 890 | 1.71 | 5.9 |
| 4 | TBS/VT/MA | 85:10:5 | 89.5 | 840 | 1.62 | 5.4 |
| 5 | TBS/VA/MA | 85:10:5 | 89.8 | 800 | 1.72 | 5.3 |
| 6 | TBS/BA/MA | 85:10:5 | 91.1 | 870 | 1.8 | 5.5 |
| 7 | TBS/MMa/MA | 87:10:3 | 95.0 | 880 | 2.2 | 4.5 |
| 8 | " | 84:10:6 | 91.3 | 870 | 1.6 | 5.4 |
| 9 | " | 83:10:7 | 95.5 | 890 | 1.5 | 5.5 |
| 10 | TBS/MMa/AA | 85.8:10:4.2 | 91.7 | 900 | 2.85 | 3.67 |
| 11 | TBS/MA | 95:5 | 96.4 | 880 | 2.23 | 4.55 |

TBS = p-tertbutylstyrene
MMa = methyl methacrylate
MA = methacrylic acid
VT = vinyltoluene
VA = vinyl acetate
BA = butyl acrylate
AA = acrylic acid

EXAMPLES 12–17

The procedure described in Example 1 is repeated, using the same mixture of monomers as therein specified but varying the weight ratio of monomer mixture to water as shown in the table below.

| Example No. | Ratio of total monomer to water | Monomer Conversion. | Particle size Å | Characteristics of polymer 0.3% soln. in AVTUR 50 Relative visc. at 25° C. | Diff. orifice flow rate, ccs/30 secs. |
|---|---|---|---|---|---|
| 12 | 1:9 | 86.7 | 820 | 2.26 | 4.4 |
| 13 | 3:7 | 83.8 | 930 | 1.76 | 5.5 |
| 14 | 2:3 | 85.6 | 920 | 1.44 | 5.8 |
| 15 | 2:3* | 91.9 | 870 | 1.78 | 5.43 |
| 16 | 9:11 | 86.7 | 950 | 1.53 | 5.68 |
| 17 | 1:1** | 98.7 | 1380 | 1.62 | 4.90 |

*In this example, only one-half of the amount of initiator shown in Example 1 is used.
**In this example, the amount of initiator shown in Example 1 is increased by 25% and this quantity was added at the start of polymerisation. A further equal quantity is added after 3 hours.

EXAMPLES 18–20

The procedure described in Example 1 is repeated, but employing different polymerisation temperatures as shown in the table below.

| Example No. | Polymerisation temperature, °C. | Monomer Conversion. | Particle Size Å | Characteristics of polymer 0.3% soln. in AVTUR 50 Relative visc. at 25° C. | Diff. orifice flow rate ccs/30 secs. |
|---|---|---|---|---|---|
| 18 | 35 | 92.4 | 830 | 1.62 | 5.08 |
| 19 | 50 | FULL | 650 | 1.44 | 3.48 |
| 20 | 60* | FULL | 730 | 1.43 | 3.0 |

*Initiator used is 0.05% of ammonium persulphate (based on momomer) only.

EXAMPLES 21–28

The procedure described in Example 1 is repeated, but with variations in the type and proportion of surfactant used as shown in the table below.

| Example No. | Surfactant | Proportion of surfactant, % based on monomer. | Monomer Conversion. % | Particle size Å | Characteristics of polymer 0.3% solution in AVTUR 50 Relative visc. at 25° C. | Diff. Orifice flow rate, ccs/30 secs. |
|---|---|---|---|---|---|---|
| 21 | "Manoxol" OT | 7.5 | 95.7 | 830 | 1.64 | 5.3 |
| 22 | " | 10 | 98.5 | 750 | 1.83 | 5.28 |
| 23 | "Perlankrol" FF | 10 | 86.7 | 720 | 2.21 | 4.25 |
| 24 | "Aerosol"MA | 5 | 93.3 | 890 | 1.6 | 5.27 |
| 25 | "Aerosol"MA/ "Manoxol"OT (1:1) | 5 | 90.0 | 870 | 1.91 | 5.32 |
| 26 | "Alcopol"OD | 5 | 92.75 | 970 | 1.38 | 3.94 |
| 27 | "Manoxol"N | 5 | 88.67 | 900 | 1.72 | 5.29 |
| 28 | Sodium Lauryl sulphate | 5 | 86.67 | 810 | 1.89 | 5.64 |

"Perlankrol"FF is a 90% active solids solution of the ammonium salt of a sulphated alkylphenol/ethylene oxide condensate in 1:9 water/alcohol, supplied by Lankro Chemicals Ltd.
"Aerosol"MA is a 80% active solids solution of sodium dihexyl sulphosuccinate in water/akcohol, supplied by American Cyanamid Company.
"Alcopol"OD is a 60% active solids solution of sodium di-tridecyl sulphosuccinate in water/alcohol, supplied by Allied Colloids Manufacturing Company.
"Manoxol"N is a 100% solids brand of sodium dihexyl sulphosuccinate, supplied by Manchem Limited.
"Perlankrol", "Aerosol"and "Alcopol"are Registered Trade Marks.

EXAMPLE 29

The procedure described in Example 1 is repeated, but replacing the L-ascorbic acid by an equal weight of sodium dithionite. The conversion of monomer to polymer is 94%, giving a dispersion of polymer of nominal solids content 19% with a particle diameter of 920 Å. A 0.3% solution of the polymer in AVTUR 50 has a relative viscosity at 25° C. of 1.88 and a differential orifice flow rate of 5.75 ccs/30 secs.

EXAMPLES 30–32

In these Examples, the general procedure of Example 1 is repeated, using the monomer mixtures described in Examples 1, 3 and 9 respectively but in each case replacing the p-tert-butylstyrene by an equal weight of 2-ethylhexyl acrylate, giving the monomer compositions shown in the table below.

| Example No. | Monomer Composition. | Monomer Ratio | Monomer Conversion, % | Polymer Particle size, Å |
|---|---|---|---|---|
| 30 | EHA/MMa/MA | 85:10:5 | 97.3 | 830 |
| 31 | " | 80:15:5 | 95.6 | 890 |
| 32 | " | 83:10:7 | 95.5 | 880 |

When dissolved in aviation kerosene, each of the polymers thus produced exhibits the ability to suppress particulate dissemination of the kerosene.

EXAMPLES 33–36

In contrast to the preceding Examples, which all illustrate a "one-shot" polymerisation procedure, the following Examples show the use of a "seed and feed" procedure to give a final dispersion of 20% solids content.

Using an apparatus as described in Example 1, a mixture of monomers as indicated in the table below is emulsified in distilled water (1440 parts) in the presence of "Manoxol" OT (18 parts). After preliminary purging of this charge with nitrogen as described in Example 1, ammonium persulphate (0.36 part) and L-ascorbic acid (0.54 part) are added and the monomer is polymerised at 28°–32° C. for a period of from 45 to 60 minutes, forming a "seed" dispersion of polymer. A further mixture of monomer as shown in the table, previously purged with nitrogen, is then fed at a steady rate over a period of 1½ hours with the polymerising mixture kept at 28°–32° C., after which the same temperature is maintained for a further 3–4 hours. Finally, chain transfer agent (octyl mercaptan) is added as described in Example 1. The results obtained are given in the table.

as to provide a "seed" dispersion containing 30% polymer solids and a final dispersion containing 50% solids. The initial monomer charge (470 parts) is a mixture of TBS, MMa and MA in the proportions 400:40:30 respectively, and this is polymerised in distilled water (1000 parts) in the presence of "Manoxol" OT (50 parts), ammonium persulphate (0.47 part) and L-ascorbic acid (0.71 part) at 28°–32° C. for a period of 4 hours, by which time the conversion of monomer to "seed" polymer is 99%. Further additions of ammonium persulphate (0.47 part) and L-ascorbic acid (0.71 part), each dissolved in water (10 parts) are then made. A second monomer charge (530 parts) consisting of a mixture of TBS, MMa and MA in the proportions 450:60:20 respectively and containing "Aerosol" TR-70 (15 parts) (a 70% solids solution in isopropyl alcohol of sodium bis(tridecyl) sulphosuccinate, supplied by American Cyanamid Company) is purged with nitrogen and then fed at a steady rate over a period of 4 hours into the reaction mixture maintained at 28°–32° C., the incoming material being introduced close to the bottom of the flask and to the stirrer. When this addition is complete, polymerisation is continued at the same temperature for 15 hours, after which chain transfer agent is introduced as described in Example 1.

The overall conversion of monomer to polymer is 94%; the dispersion obtained has a particle size of 980 Å, and a 0.3% solution of the copolymer in AVTUR 50 has a relative viscosity of 1.55 and a differential orifice flow rate of 4.85.

We claim:

1. A process for the production of a copolymer from a mixture consisting of (i) a monomer selected from alkylstyrenes in which the alkyl group contains from 3 to 6 carbon atoms, the acrylic and methacrylic acid esters of aliphatic monohydric alcohols containing from 6 to 18 carbon atoms, vinyl esters of aliphatic carboxylic acids containing from 6 to 18 carbon atoms and vinyl ethers of aliphatic monohydric alcohols containing from 6 to 18 carbon atoms; (ii) from 2% to 8%, based on the total monomer mixture, of acrylic acid or methacrylic acid; and (iii) from 0% to 25%, based on the total monomer mixture, of one or more monomers selected from the acrylic and methacrylic esters of aliphatic monohydric alcohols containing from 1 to 4 carbon atoms, 2-ethoxyethyl methacrylate, acrylonitrile, vinyl acetate and vinyltoluene, the process comprising the emulsion polymerisation, in a wholly aqueous diluent as hereinbefore defined, of the said monomer mixture and being characterised by the following features in combination:

(a) the ratio of the total weight of monomer mixture which is polymerised in the process to the weight

| Example No. | Monomer composition (parts) | | | | | | Monomer Conversion % | Characteristics of Polymer | | |
|---|---|---|---|---|---|---|---|---|---|---|
| | Seed stage | | | Feed stage | | | | Particle size Å | 0.3% solution in AVTUR 50 | |
| | TBS | MMa | MA | TBS | MMa | MA | | | Rel. visc. 25° C. | Differential orifice flow rate, ccs/30 seconds. |
| 33 | 50 | 6 | 9 | 256 | 30 | 9 | 93 | 780 | 1.63 | 4.97 |
| 34 | 50 | 6 | 4 | 256 | 30 | 14 | 89 | 800 | 1.78 | 5.13 |
| 35 | 50 | 6 | 13.5 | 256 | 30 | 4.5 | 88 | 690 | 1.49 | 4.71 |
| 36 | 50 | 6 | 13.5 | 260.5 | 30 | 0 | 89 | 770 | 1.98 | 4.86 |

EXAMPLE 37

The procedure of Examples 33–36 is repeated, but with altered amounts and proportions of monomers so of liquid diluent is from 1:19 to 3:2 by weight;

(b) there is present in the reaction mixture an anionic surfactant at a concentration in the range 3% to 20% of the total weight of monomer mixture which is polymerised;

(c) the reaction mixture is stirred at a temperature in the range 15°–60° C. for a period of from 6 to 10 hours in the presence of an inert gas atmosphere;

(d) there is added to the reaction mixture, after the establishment of the inert gas atmosphere, in an amount of 0.05% to 1.0% based on the weight of monomer mixture, a water-soluble initiator which is effective at the chosen polymerisation temperature;

(e) there is added to the reaction mixture when polymerisation of the monomers is complete, in an amount of from 0.001% to 0.1% based on the weight of monomer mixture taken, a chain transfer agent.

2. A process as claimed in claim 1, wherein the whole of the monomer mixture to be polymerised is introduced into the reaction mixture at the beginning of the process and the weight ratio of the monomer mixture to the aqueous diluent is in the range 1:4 to 1:1.

3. A process as claimed in claim 1 or claim 2, wherein a proportion of the monomer mixture to be polymerised is introduced into the reaction mixture as a single initial charge in order to form a seed dispersion of polymer, the remainder of the monomer mixture then being added gradually after polymerisation of the initial charge is complete, and wherein the initial monomer charge is in a weight ratio to the aqueous diluent of from 1:19 to 3:7 and the amount of remaining monomer mixture is sufficient to bring the overall ratio of monomer taken to diluent into the range 2:3 to 3:2.

4. A process as claimed in claim 1 or claim 2, wherein the anionic surfactant is selected from sodium dodecylbenzenesulphonate, sodium dioctylsulphosuccinate, sodium lauryl sulphate and the salts of sulphated nonylphenol-ethylene oxide condensates and is used in an amount of from 5% to 10% of the weight of the monomer mixture.

5. A process as claimed in claim 1 or claim 2, wherein the polymerisation is carried out at a temperature of from 28° to 35° C. for a period of from 6 to 10 hours.

6. A process as claimed in claim 1 or claim 2, wherein the initiator system consists of ammonium persulphate is combination with ascorbic acid and is used in an amount in the range 0.1% to 0.3% of the weight of the monomer mixture.

7. A process as claimed in claim 1 or claim 2, wherein the chain transfer agent is selected from n-octylmercaptan, dodecylmercaptan and chloroform and is used in an amount of about 0.005% of the weight of the monomer mixture.

8. A copolymer whenever produced by a process as claimed in claim 1 or claim 2.

9. A liquid hydrocarbon fuel suitable for use in gas turbine engined aircraft and having a flash point of at least 80° F. in which is dissolved, in a concentration of from 0.05% to 1.0% by weight, a copolymer produced by a process as claimed in claim 1 or claim 2.

10. A liquid hydrocarbon fuel as claimed in claim 9, wherein the copolymer is derived from (i) from 77% to 91% by weight of p-tert-butylstyrene, (ii) from 7% to 15% by weight of methyl methacrylate and (iii) from 2% to 8% of methacrylic acid.

* * * * *